(12) United States Patent
Otsuka et al.

(10) Patent No.: US 8,855,796 B2
(45) Date of Patent: Oct. 7, 2014

(54) METHOD AND DEVICE FOR DETECTING MUSIC SEGMENT, AND METHOD AND DEVICE FOR RECORDING DATA

(75) Inventors: Isao Otsuka, Tokyo (JP); Hidetsugu Suginohara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1448 days.

(21) Appl. No.: 12/087,248

(22) PCT Filed: Dec. 25, 2006

(86) PCT No.: PCT/JP2006/325720
§ 371 (c)(1),
(2), (4) Date: Jun. 27, 2008

(87) PCT Pub. No.: WO2007/074755
PCT Pub. Date: Jul. 5, 2007

(65) Prior Publication Data
US 2009/0088878 A1   Apr. 2, 2009

(30) Foreign Application Priority Data

Dec. 27, 2005   (JP) .................. 2005-374205

(51) Int. Cl.
| | | |
|---|---|---|
| G06F 17/00 | (2006.01) | |
| H04N 9/82 | (2006.01) | |
| G10H 1/00 | (2006.01) | |
| G10L 25/78 | (2013.01) | |
| H04N 5/781 | (2006.01) | |
| G11B 20/10 | (2006.01) | |
| H04N 9/804 | (2006.01) | |
| H04N 5/85 | (2006.01) | |
| H04N 9/806 | (2006.01) | |

(52) U.S. Cl.
CPC ........... *G10H 1/00* (2013.01); *G10H 2210/031* (2013.01); *H04N 5/781* (2013.01); *H04N 9/8205* (2013.01); *G11B 2020/10546* (2013.01); *H04N 9/8042* (2013.01); *G10L 25/78* (2013.01); *H04N 5/85* (2013.01); *H04N 9/8063* (2013.01)
USPC .......................................... 700/94

(58) Field of Classification Search
USPC ............................................. 700/94
See application file for complete search history.

(56) References Cited

U.S. PATENT DOCUMENTS 5,298,674 A   3/1994 Yun
5,375,188 A   12/1994 Serikawa et al.
(Continued)

FOREIGN PATENT DOCUMENTS

EP   1 150 446 A2   10/2001
JP   05-088695 A    4/1993
(Continued)

OTHER PUBLICATIONS

Otsuka et al., "A highlight scene detection and Video Summarization System Using Audio Feature for a Personnal Video Recorder", 2005 Digest of Technical Papers, Intentional Conference on Consumer Electronics (IEEE Cat No. 05CH37619) IEEE Piscataway, NJ, Jan. 8, 2005, pp. 223-224; XP010796612.

(Continued)

*Primary Examiner* — Paul McCord
(74) *Attorney, Agent, or Firm* — Birch, Stewart, Kolasch & Birch, LLP

(57) ABSTRACT

The present invention is to provide a method of efficiently detecting music scenes from television broadcasts.
A music-segment detection method according to the present invention includes a data input step of inputting data including an audio and video signals; a plurality of candidate-music-segment detection steps of detecting candidate music-segments from the audio signal based on criteria different from each other; and a music-segment detection step of detecting a music segment based on the plurality of detected candidate music-segments. Thereby, high detection accuracy can be ensured for a wide variety of music with various tones, such as rock, popular ballad, and classic.

10 Claims, 12 Drawing Sheets

(56) References Cited

U.S. PATENT DOCUMENTS

| | | |
|---|---|---|
| 5,712,953 A | 1/1998 | Langs |
| 5,794,194 A * | 8/1998 | Takebayashi et al. ........ 704/251 |
| 6,525,255 B1 | 2/2003 | Funaki et al. |
| 7,260,439 B2 * | 8/2007 | Foote et al. ..................... 700/94 |
| 7,336,890 B2 * | 2/2008 | Lu et al. ......................... 386/239 |
| 7,386,217 B2 | 6/2008 | Zhang |
| 7,610,205 B2 * | 10/2009 | Crockett ....................... 704/503 |
| 7,626,111 B2 * | 12/2009 | Kim et al. ........................ 84/600 |
| 2002/0152207 A1 * | 10/2002 | Lyudovyk et al. ................. 707/6 |
| 2003/0182105 A1 * | 9/2003 | Sall et al. ...................... 704/206 |
| 2003/0194210 A1 * | 10/2003 | Shiiyama ......................... 386/68 |
| 2004/0143349 A1 * | 7/2004 | Roberts et al. .................. 700/94 |
| 2004/0148164 A1 * | 7/2004 | Baker ............................ 704/231 |
| 2004/0167767 A1 | 8/2004 | Xiong et al. |
| 2004/0170392 A1 | 9/2004 | Lu et al. |
| 2005/0075743 A1 * | 4/2005 | Kondo et al. .................... 700/94 |
| 2005/0109194 A1 * | 5/2005 | Gayama ........................... 84/613 |
| 2005/0154973 A1 | 7/2005 | Otsuka et al. |
| 2005/0154987 A1 | 7/2005 | Otsuka et al. |
| 2005/0169114 A1 | 8/2005 | Ahn |
| 2005/0198570 A1 | 9/2005 | Otsuka et al. |
| 2005/0211071 A1 * | 9/2005 | Lu et al. ........................... 84/611 |
| 2005/0216261 A1 * | 9/2005 | Garner et al. .................. 704/215 |
| 2005/0246169 A1 * | 11/2005 | Lahti ............................... 704/215 |
| 2006/0149693 A1 | 7/2006 | Otsuka et al. |
| 2006/0212297 A1 * | 9/2006 | Chaudhari et al. ............ 704/278 |
| 2006/0266200 A1 | 11/2006 | Goodwin |
| 2007/0169613 A1 * | 7/2007 | Kim et al. ........................ 84/609 |
| 2007/0230899 A1 | 10/2007 | Shiiyama |

FOREIGN PATENT DOCUMENTS

| | | |
|---|---|---|
| JP | 08-265660 A | 10/1996 |
| JP | 9-9199 A | 1/1997 |
| JP | 09-284704 A | 10/1997 |
| JP | 10-207455 A | 8/1998 |
| JP | 11-55613 A | 2/1999 |
| JP | 11-266435 A | 9/1999 |
| JP | 2000-99069 A | 4/2000 |
| JP | 3156975 B2 | 4/2001 |
| JP | 2002-344852 A | 11/2002 |
| JP | 2003-99083 A | 4/2003 |
| JP | 2003-298981 A | 10/2003 |
| JP | 2003-309814 A | 10/2003 |
| JP | 3475317 B2 | 12/2003 |
| JP | 2004-120553 A | 4/2004 |
| JP | 2005-284308 A | 10/2005 |
| JP | 2006-301134 A | 11/2006 |
| WO | WO-03/071537 A1 | 8/2003 |

OTHER PUBLICATIONS

Otsuka et al., "Detection of Music Segment Boundaries using Audio-Visual Features for a Personal Video Recorder" IEEE Transactions on Consumer Electronics, IEEE Service Center, New York, NY, vol. 53, No. 1, Feb. 1, 2007, pp. 150-154. XP011175935.

Otsuka et al., "Detection of Music Segment Boundaries using Augio-Visual Features for a Personal Video Recorder", Consumer Electronics, Jan. 1, 2007, pp. 1 and 2. XP031071464.

English-Language Translation of Chinese Office Action for corresponding Application No. CN 200680043035.7 dated Aug. 4, 2010.

Japanese Office Action for corresponding Application No. 2006-132898 dated Sep. 18, 2009 and English-language translation thereof.

USPTO Office Action for corresponding U.S. Appl. No. 12/300,325 dated Aug. 19, 2011.

USPTO Office Action for corresponding U.S. Appl. No. 12/300,325 dated May 10, 2012.

U.S. Notice of Allowance, dated Nov. 8, 2013, issued in copending U.S. Appl. No. 12/300,325.

* cited by examiner

METHOD AND DEVICE FOR DETECTING MUSIC SEGMENT, AND METHOD AND DEVICE FOR RECORDING DATA

TECHNICAL FIELD

The present invention relates to methods and devices for detecting a music segment from data obtained from a television broadcast and the like, and to methods and devices for recording data including that of a music segment detected by the detection methods onto a recording medium including a recordable digital versatile disc such as a DVD-R or a DVD-RW, a hard disk, or a Blu-ray Disc.

BACKGROUND OF THE INVENTION

In one of television broadcasts, there is a genre so called "song program" or "music program". In many cases, music programs consist of pictures of singing or playing instruments by performers or music pictures through video streams (hereinafter, referred to as "music scene" and it is noted that in the present specification the music scene denotes pictures as a whole including in its audio, music such as singing and playing instruments), and consist of pictures other than music, such as introductions of music pieces by the host and others and talk (conversation) shows by the host with its performers (hereinafter, referred to as "non-music scene").

In commercial broadcasting, programs may include commercial message broadcasts for advertisements from program sponsors or broadcasters themselves (hereinafter, referred to as "CM broadcast", and a commercial broadcast segment is referred to as "CM broadcast segment".

When playing back a recorded music program, a viewer who wants to concentrate on music has a request to efficiently skip scenes other than music ones such as non-music scenes and CM broadcasts. On the other hand, a viewer who is not interested in music has a request to view only non-music scenes such as talk shows by skipping music scenes and CM broadcasts.

For such requests, a conventional method of detecting and recording music identifies music scenes making use of a feature that peaks in the frequency spectrum of sound information are temporally stable in frequency, to store only audio/video attributed to the music scenes (for example, refer to Patent Document 1).

Patent Document 1: Japan Patent Application Publication No. H11-266435 (FIG. 1 on page 5)

However, in a method of detecting music as disclosed in Patent Document 1, since detection of music scenes is discriminated with such a single technique, it is difficult to ensure equal detection accuracy over the whole variety of music with various tones, such as rock, popular ballad, and classic.

The present invention is made to resolve the problem as described above and to provide a method and a device for efficiently detecting music scenes from data containing a video signal and an audio signal of a television broadcast and the like.

SUMMARY OF THE INVENTION

A music-segment detection method according to the present invention includes a data input step of inputting data including an audio and video signals; a plurality of candidate-music-segment detection steps of detecting, from the audio signal, candidate music-segments of the inputted data, based on criteria different from each other; and a music-segment detection step of detecting a music segment based on the plurality of detected candidate music-segments.

A music-segment detection method according to the present invention, since it detects from an audio signal candidate music-segments based on a plurality of criteria different from each other and further detects a music segment from the plurality of detected candidate music-segments, can ensure high detection accuracy for a wide variety of music with various tones, such as rock, popular ballad, and classic.

EXPLANATION OF REFERENCE CHARACTERS

Figure 1:
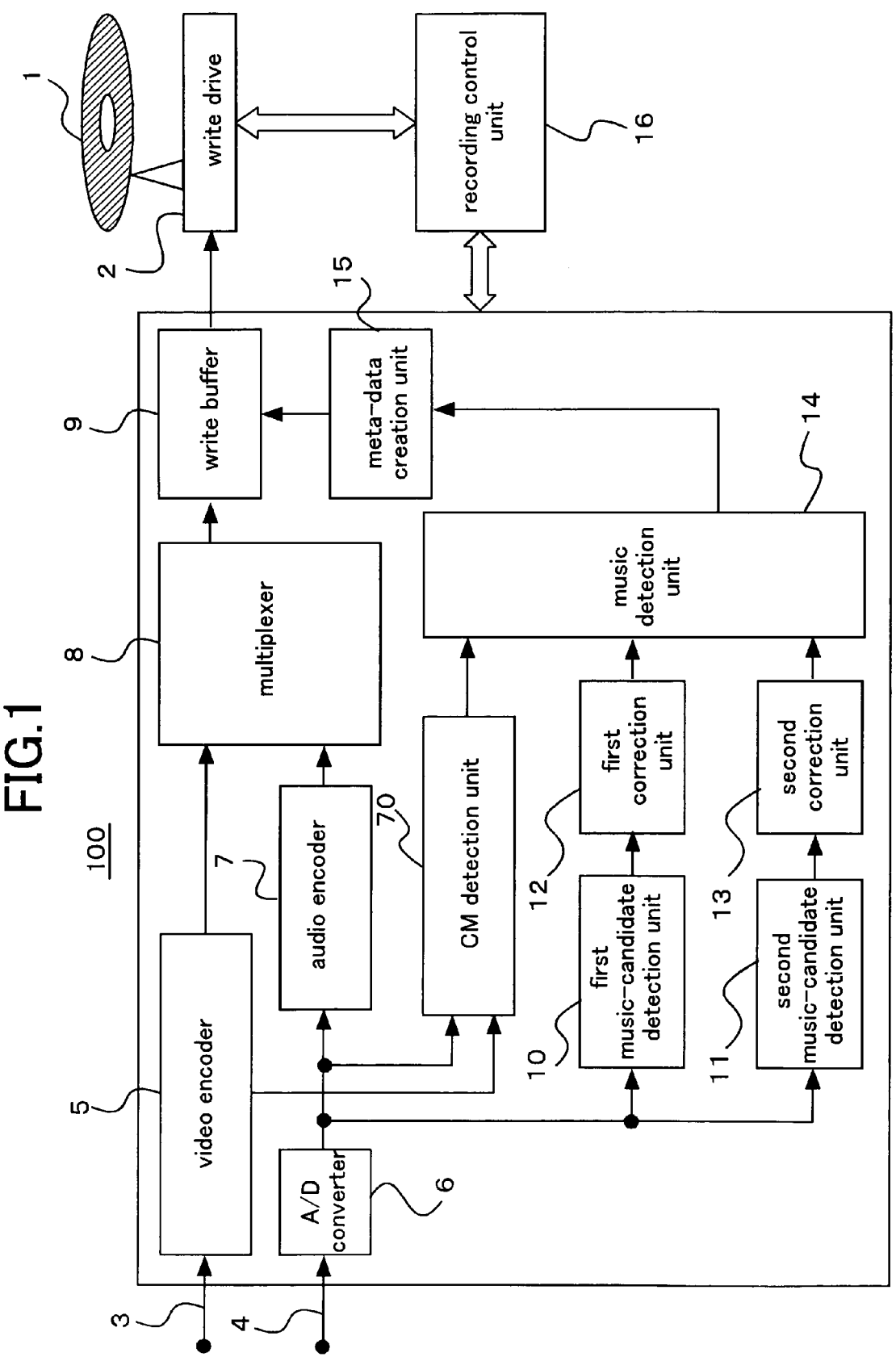
FIG. 1 is a block diagram illustrating an audio/video recording device of Embodiment 1.

1: storage medium
2: write drive
3: video signal
4: audio signal
5: video encoder
6: A/D converter
7: audio encoder
8: multiplexer
9: write buffer
10: first music-candidate detection unit
11: second music-candidate detection unit
12: first correction unit
13: second correction unit
14: music detection unit
15: meta-data generation unit
16: recording control unit
20: orthogonal transform processing section
21: likelihood-comparison processing section
22: model data
30: difference-calculation processing section
40: elapsed time (horizontal axis)
41: differential amount (vertical axis)
42: differential amounts
43: threshold value
44: label axis
45: labels
46a, 46b, 46c: candidate music-segment 47: correction-processed labels
48: correction-processed candidate music-segment
50: correction-processed labels
51a, 51b, 51c: correction-processed candidate music-segment
52: correction-process labels
53a, 53b, 53c, 53d: correction-processed candidate music-segment
54: detection-processed labels
55a, 55b, 55c, 55d: music segment
60: detection processed labels
61a, 61b, 61c: music segment
70: CM detection unit
71: music detection unit
80: detection-processed labels
81a, 81b: music segment
82: CM labels
83a: CM broadcast segment
84: CM-correction-processed labels
85a, 85b: music segment
86: label axis
90: root directory
91: multimedia directory
92: meta-data directory
93: information management file
94: multimedia data file
95: backup file
96: meta-data file
100: audio/video recording device
130: meta-data
131a: meta-data management information
131b: program meta-data information search pointer
131c: program meta-data information
132a: general meta-data information
132b: music-map information
133a: general music-map information
133b: music entries
134a: music start-time information
134b: music end-time information
400: differential amount graph
405: label graph
407: correction-processed label graph
500: correction-processed label graph
502: correction-processed label graph
504: detection-processed label graph
600: detection-processed label graph
700: audio/video recording device

BEST MODE FOR CARRYING OUT THE INVENTION

Embodiment 1

Hereinafter, an explanation will be made on methods of detecting and recording music and detection and recording devices therefor according to Embodiment 1 with reference to the drawings. The music detection method of Embodiment 1 has a feature in that candidate music-segments, each are detected from an audio signal based on a plurality of criteria different from each other, and a music segment is further detected from the plurality of candidate music-segments having been detected.

In the present specification, when a music scene is recorded, a segment specified by time-position information that denotes the start and end times of the music scene with respect to the start point of the recording is defined as "music segment".

A method of controlling playback of audio/video recorded in a storage medium is explained here. Generally, when taking such playback control as described before, a presentation time (PTM), using which the time-position information is obtained by counting scenes at 90 kHz, is widely used. That is, the method is a method in which a PTM refers to a start time and an end time as time-position information in order to specify a music segment. Other than this, there is a method such that, when audio/video is discretized at fixed time intervals such as one second on a recording time axis, segments are binarized in such a way that music scene segments are labeled with "High" (one) and non-music scene segments are labeled with "Low" (zero) to search a segment with "High". In the specification, information for specifying the start and end points of a music segment is referred to as "music information".

Figure 2:
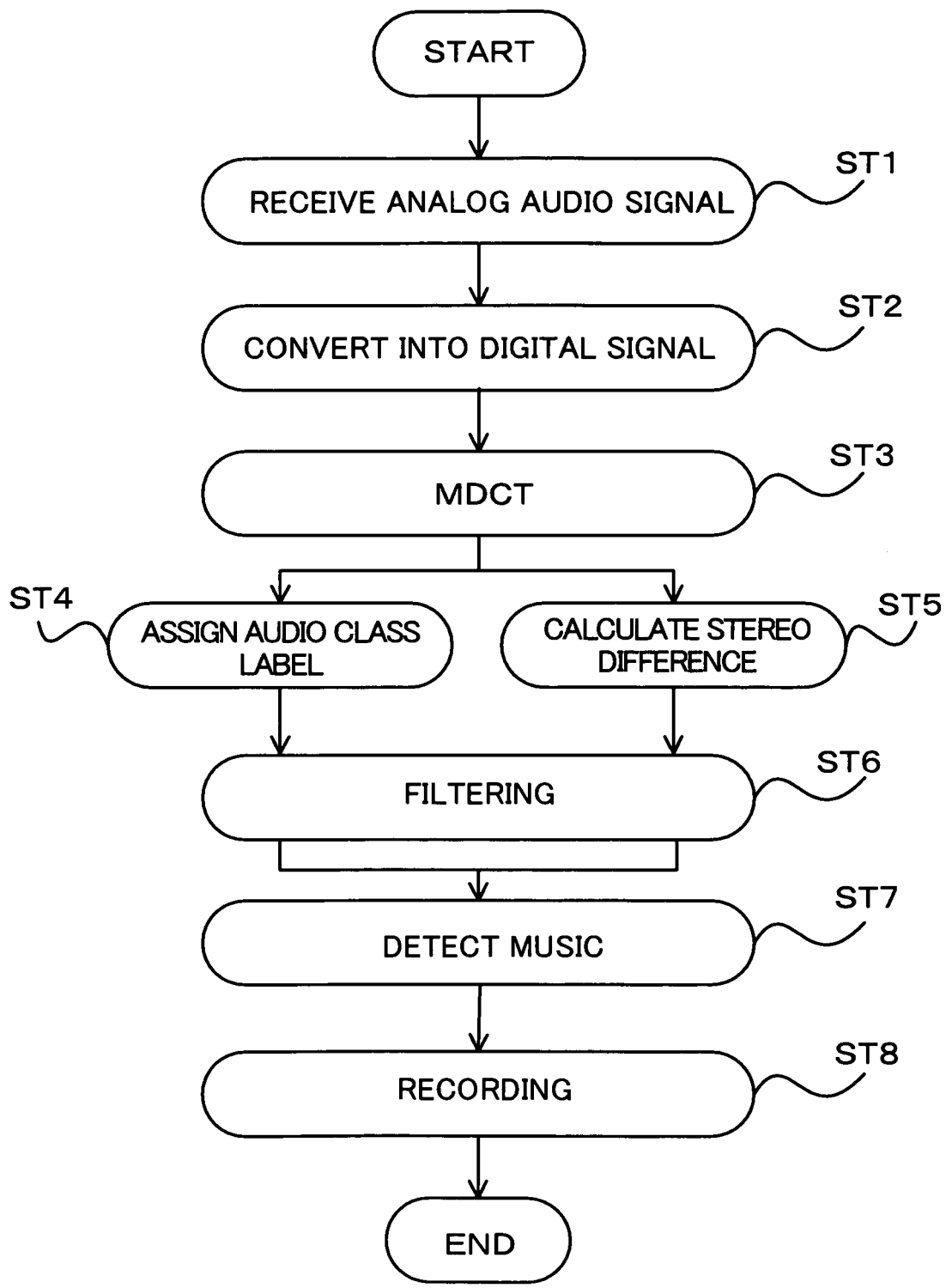
FIG. 2 is a flow chart illustrating a method of detecting and recording music segments, according to Embodiment 1.

FIG. 1 is a block diagram illustrating an audio/video recording device of Embodiment 1, and FIG. 2 is a flow chart illustrating a method of detecting and recording music segments according to Embodiment 1. First, the audio/video recording device of Embodiment 1 is outlined with reference to FIGS. 1 and 2. An audio/video recording device 100 is inputted with a video signal 3 and an audio signal 4 of a television broadcast or the like to be recorded (ST1). Then, the video signal 3 is converted into video data by being compression-encoded using an MPEG-2 scheme or the like in a video encoder 5.

The audio signal 4, when being an analog signal, is converted into a digital signal by an analog-to-digital converter 6 (A/D converter) using a PCM (pulse code modulation) technique or the like, in which amplitude is converted into data in such a way that an audio waveform is sampled at constant time intervals (ST2). After that, the signal is compression-encoded into audio data in an audio encoder 7 using the Dolby AC-3 algorithm or the like.

A multiplexer 8 multiplexes the video data and the audio data, to generate multimedia data. After that, a write buffer 9 successively loads the multimedia data and then sends it to a write drive 2, so that the multimedia data is recorded onto a removable storage medium 1 such as a DVD-R disc, a DVD-RW disc, or a recordable Blu-ray Disc (the series of processing is also referred to as "video recording"). Operations of the audio/video recording device 100 and the write drive 2 are systematically managed and controlled by a recording control unit 16 composed of a microprocessor and the like. In addition, the storage medium 1 and the write drive 2 may be replaced with a non-removable storage medium such as a hard disk drive (HDD).

Next, an explanation will be made on a plurality of music-candidate detection units that are distinguishing constituent elements of the audio/video recording device of Embodiment 1. A first music-candidate detection unit 10 analyzes the PCM formatted digital signal outputted from the A/D converter 6 to detect a candidate music-segment (ST3 and ST4). A first correction unit 12 corrects detection errors as required in the candidate music-segment detected by the first music-candidate detection unit 10 (ST6). Similarly to the first music-candidate detection unit 10, a second music-candidate detection unit 11, which has a criterion different from that of the first music-candidate detection unit 10, also detects a candidate music-segment (ST3 and ST5), and a second correction unit 13 corrects detection errors therein as required (ST6).

A music detection unit 14 determines whether the candidate music-segments, each having been detected and corrected by the first music-candidate detection unit 10 and the first correction unit 12 and by the second music-candidate detection unit 11 and the second correction unit 13, are to be integrated, or to be adopted or rejected, so that a music segment is detected (ST7). The detected music segment is converted into meta-data by a meta-data generation unit 15, to be recorded onto the storage medium 1 through the write buffer 9 (ST8). In addition, the meta-data generation unit 15 has a memory function holding the music information of music segments determined by being successively computed.

Incidentally, not only the write drive 2 but also the multiplexer 8, the meta-data generation unit 15, the write buffer 9, and the recording control unit 16 may be included in the concept of a recording unit of the audio/video recording device 100.

While the description has been made here on the case of the two music-candidate detection units 10 and 11 to detect candidate music-segments, an audio/video recording device may be configured to include more music-candidate detection units. Moreover, while the description has been made on the configuration in which the correction units 12 and 13, after individually correcting the candidate music-segments each having been detected by the music-candidate detection units 10 and 11, output the corrected candidate music-segments to the music detection unit 14, an audio/video recording device may be configured so that one correction unit, after correcting, not individually correcting, the candidate music-segments, outputs the corrected candidate music-segments to the music detection unit 14. Furthermore, an audio/video recording device may be configured so as to correct a music segment having been detected by the music detection unit 14.

Figure 3:
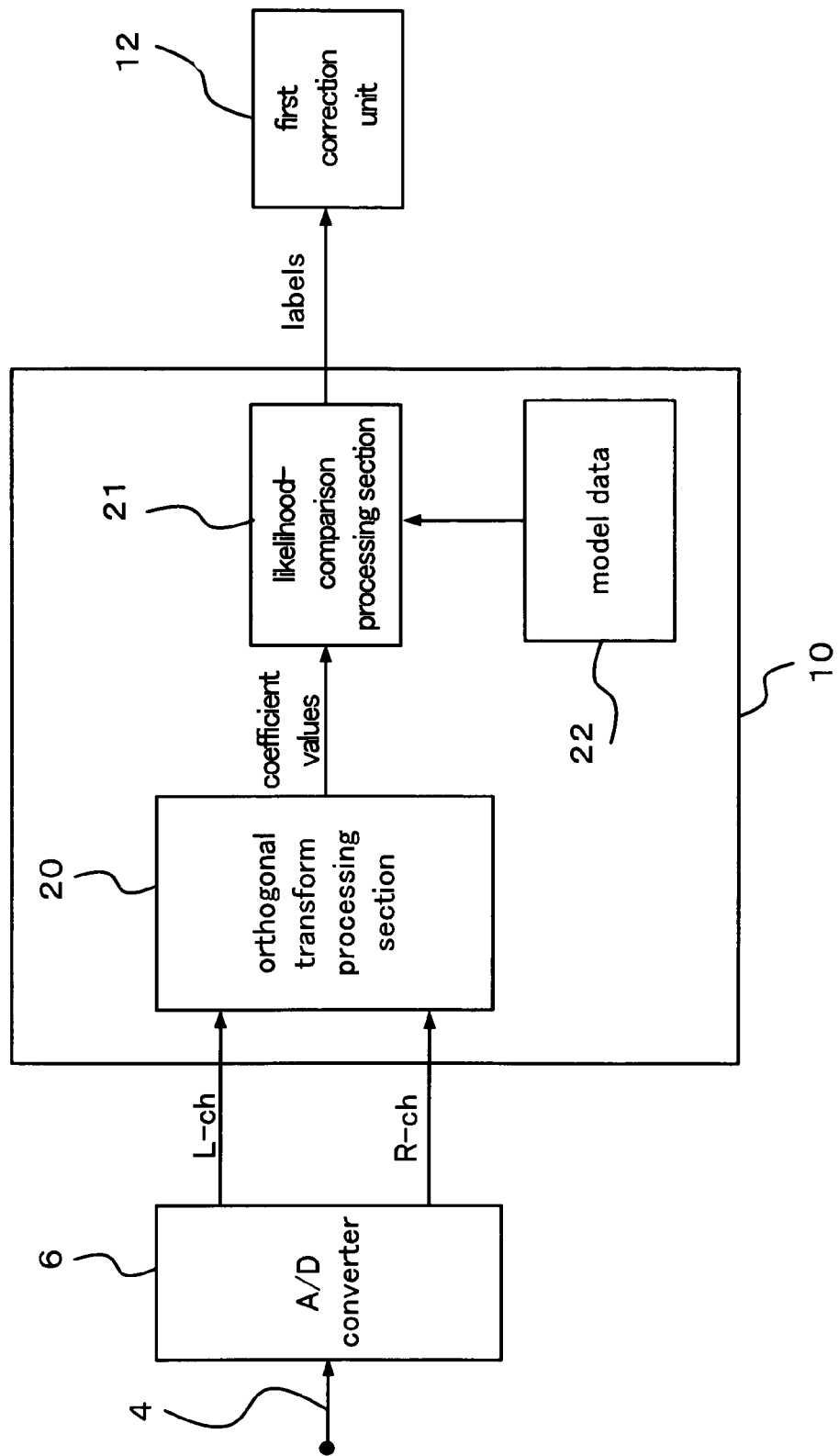
FIG. 3 is a block diagram illustrating a first music-candidate detection unit of Embodiment 1.

FIG. 3 is a functional block diagram illustrating in detail the first music-candidate detection unit 10 of Embodiment 1. The first music-candidate detection unit 10 is configured with an orthogonal transform processing section 20, a likelihood-comparison processing section 21, and model data 22 that is table data for reference. As shown in the figure, the orthogonal transform processing section 20 calculates orthogonal transform coefficients for the digital signal converted by the A/D converter 6; and then the likelihood-comparison processing section 21 assigns labels by referencing the model data 22, to output the labels to the first correction unit 12.

The detection of a candidate music-segment by the first music-candidate detection unit 10 will be further explained in detail. When the audio signal 4 consists of stereo signals, PCM data of the right and left channels are individually obtained in the A/D converter 6. The stereo signals, when used in recorders for consumer use, is required to have a quality that their sampling frequency and quantization bit rate are 48 kHz and 16 bits, respectively.

In the orthogonal transform processing section 20, the PCM data is orthogonally transformed from the time domain to the frequency domain (ST3). An example of using for the orthogonal transformation a modified discrete cosine transform (MDCT), which time-wise overlaps 50% of the PCM data, is explained. In order to perform the 50%-overlap, when sampling 512 items of the PCM data, 256 orthogonal transform coefficients (MDCT coefficients) are obtained for the right and left channels each. Coefficient vectors of 256 dimensions are obtained from the orthogonal transform coefficients for a single channel (for example, the left channel) of the stereo signals or the one channel of a monaural signal. The number of dimensions of the coefficient vectors may be reduced using a projective transformation for reduction of computational complexity.

Before analyzing the inputted audio signals, coefficient vectors of audio that are discriminated to be an apparent music scene from a subjective evaluation are collected as training data in advance to model distribution characteristics of the coefficient vectors using a Gaussian mixture model (GMM method). A model generated from music scenes is referred to as "music class model". Besides this, a plurality of audio class models is prepared using the Gaussian mixture model by similarly collecting training data regarding non-music scenes such as those of prominent rousing and encouraging cheers, applause, and laughing voices by audiences, and talk scenes by performers.

The model data 22 is table data that these audio class models can refer to. The likelihood-comparison processing section 21 finds by referring to the model data 22 an audio class that has the highest likelihood of the orthogonal transform coefficient vectors in the vector space, of an audio signal being recorded, to assign the audio class as a label to the segment (ST4).

Namely, when there is an audio input that has high likelihood of the frequency characteristic of a music class model, a label indicating music is assigned, whereby the segment can be detected as a music scene. In addition, likelihood comparison using a Gaussian mixture model may not necessarily be used: a statistical technique such as a hidden Markov model (HMM) may be used as long as the technique identifies an audio class for an input signal by referring to models prepared in advance.

The technique that assigns a label indicating music by likelihood comparison using a Gaussian mixture model has an advantage that only a music scene can be detected with high probability without being influenced by the number of channels of a stereo broadcast, a monaural broadcast, or the like. On the other hand, the method has a disadvantage that accuracy of detecting a boundary between a music scene and a non-music scene is slightly poor. Depending on a way of collecting training data, an advantage and a disadvantage may also arise from tones of music and instrument compositions such as rock, popular ballad, and classic.

Figure 4:
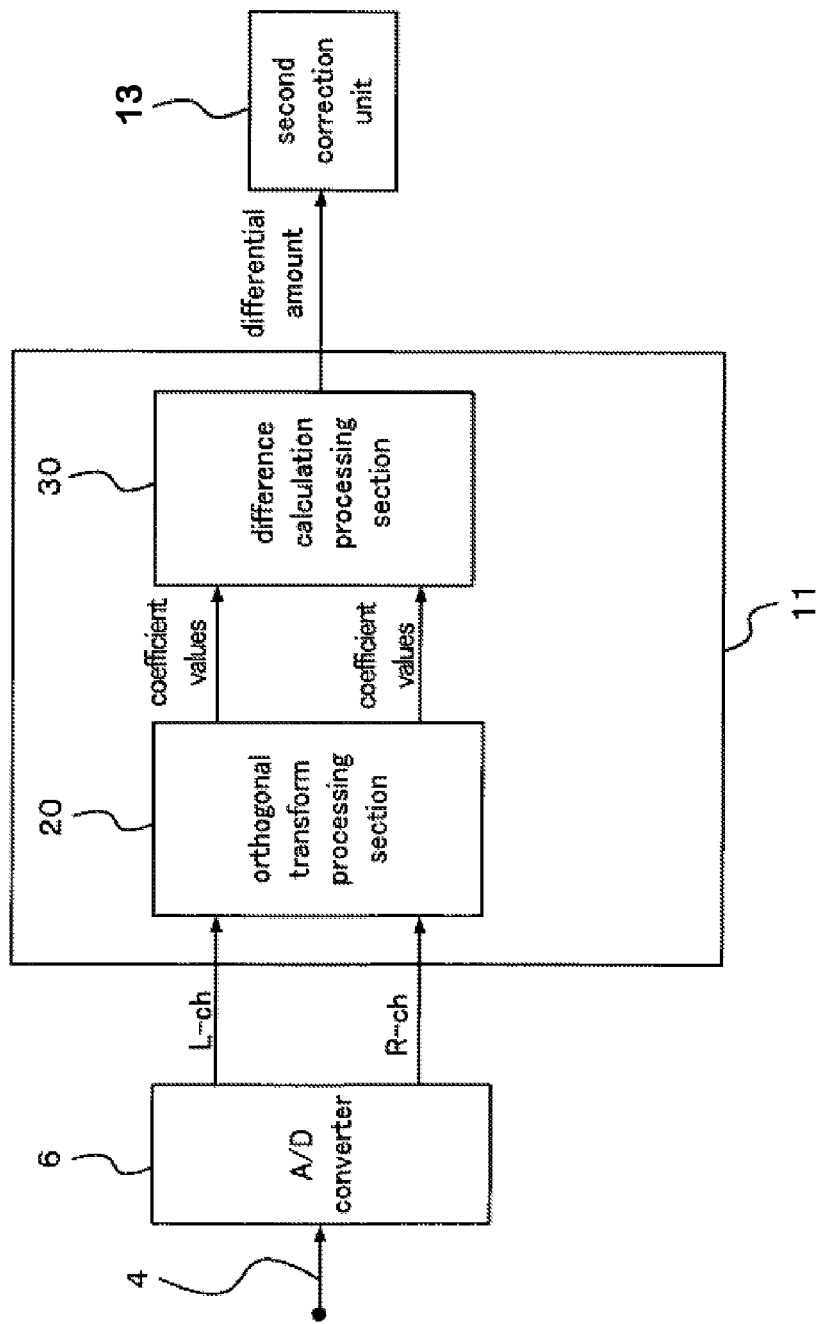
FIG. 4 is a block diagram illustrating a second music-candidate detection unit of Embodiment 1.

Next, the second music-candidate detection unit 11 will be explained. FIG. 4 is a functional block diagram illustrating in detail the second music-candidate detection unit 11 of Embodiment 1. The second music-candidate detection unit 11 is configured with the orthogonal transform processing section 20 and a difference-calculation processing section 30. As shown in the figure, the orthogonal transform processing section 20 calculates orthogonal transform coefficients for the digital signal converted by the A/D converter 6; and then the difference-calculation processing section 30 calculates a differential amount between the orthogonal transform coefficients, to output the amount to the second correction unit 13.

The detection of a candidate music-segment by the second music-candidate detection unit 11 is further explained in detail. The process of obtaining the 256 orthogonal transform coefficients (MDCT coefficients) from the audio signal 4 through the orthogonal transform processing section 20 (ST3) is the same as that described in the explanation of the first detection music-candidate unit 10; hence the explanation of the process is omitted here.

Defining the orthogonal transform coefficients as a (1×256) matrix, and expressing an orthogonal transform coefficient of the n-th column for the right channel as Mr(n) and that for the left channel as Ml(n), a differential amount D, which is the summation of the squared difference between orthogonal coefficient matrixes for both channels, is obtained in the difference-calculation processing section 30 by the following equation:

$$D = \sum_{n=1}^{256} (M_l(n) - M_r(n))^2 \qquad \text{Equation 1}$$

By successively executing the processing, changes in the differential amount D for a program to be recorded can be grasped (ST5). In addition, while the differential amount D is defined as the summation of squared difference between the orthogonal coefficient matrixes, another equation may be used as long as it can numerically evaluate the difference between the right and left channels.

The differential amount indicates the difference between the right and left channels and is also expressed as soundscape feeling, stereo feeling, or the like. It is generally known that music scenes give strong soundscape feeling and non-music scenes such as talk scenes by performers give a little soundscape feeling. That is, a segment that has a differential amount exceeding a predetermined value (threshold value) can be detected as a music scene.

Generally, since a differential amount varies by large amount at the boundary between a music scene and a non-music scene, the technique that detects the differential amount between orthogonal coefficient matrixes for the right and left channels has an advantage that the start and end times of a music scene can be detected with high accuracy. On the other hand, the method has such disadvantages that a large differential amount happens to be detected in a non-music scene in a program of a concert, live venue, or the like, which always gives strong soundscape feeling, and that no differential amounts can be detected in monaural broadcasts. Moreover, an advantage and a disadvantage may also arise from tones of music and instrument compositions such as rock, popular ballad, and classic.

Figure 5:
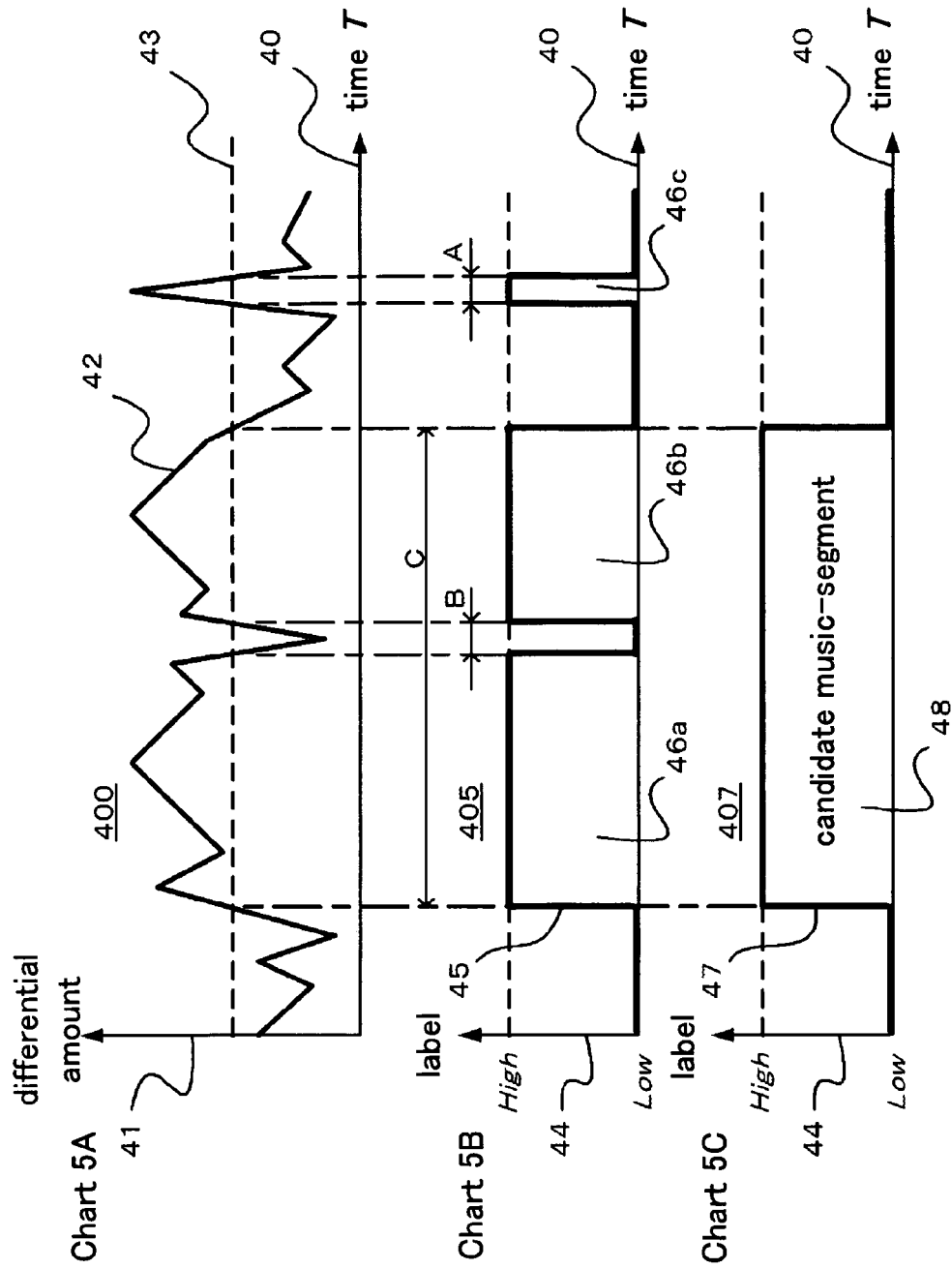
FIG. 5 shows charts illustrating a correction process according to Embodiment 1.

FIG. 5 shows charts illustrating processes of the correction processing (corresponding to "FILTERING" in ST6 in FIG. 2) according to Embodiment 1. Chart 5A in the figure is a graph 400 in which differential amounts 42 are plotted that are calculated by the second music-candidate detection unit 11. The horizontal axis denotes an elapsed time 40 of a recorded program and the vertical axis 41 denotes a differential amount.

In the second correction unit 13, the differential amounts 42 are binarized using a predetermined threshold value 43, to assign a label indicating music to a segment exceeding the threshold value 43 and a label indicating non-music to a segment below the threshold value 43. Chart 5B in the figure is a graph 405 in which binarized labels 45 are plotted: segments assigned with the label indicating music and segments assigned with the label indicating non-music are expressed with the label axis 44 as "High" and "Low", respectively. Chart 5C in the figure is a graph 407 in which corrected labels 47 are plotted that are obtained by correction-processing the labels 45.

The correction processing by the second correction unit 13, for the differential amounts calculated in the second music-candidate detection unit 11 is explained in detail here with reference to FIG. 5. The binarization of the differential amounts 42, which are an example, using the threshold value 43 detects three candidate music-segments 46a, 46b, and 46c as shown by the labels 45.

Then, the following three correction processes are performed as required for the labels 45 obtained by the binarization:

(a) If a candidate music-segment labeled with music lasts less than a predetermined time T1 (for example, five seconds), its label is changed to non-music ("Low").

(b) If the time interval between successive candidate music-segments lasts within a predetermined time T2 (for example, five seconds), the label of the time interval labeled with non-music is changed to music ("High").

(c) After performing the above label changes by the processes (a) and (b), a segment labeled with music that lasts exceeding a predetermined time T3 (for example, sixty seconds) is determined to be a corrected candidate music-segment. Incidentally, either one of the process (a) or the process (b) may be omitted.

Explaining with reference to Chart 5B, the candidate music-segment 46c, because its time interval A is shorter than the predetermined time T1, changes to a non-music segment according to the correction process (a); and the candidate music-segments 46a and 46b, and the segment therebetween having a time interval B, because the interval is shorter than the predetermined time T2, come into one candidate music-segment according to the correction process (b). As a result, a music segment 48 is obtained according to the correction processes because the time interval C of the candidate music-segment thus obtained lasts exceeding the predetermined time T3.

A correction processing by the first correction unit 12, for labels calculated in the first music-candidate detection unit 10 is also explained with reference to FIG. 5. Since labels indicating music and non-music are originally calculated in binary in the first music-candidate detection unit 10, plots of the labels become the labels 45 in Chart 5B without being processed. In the labels 45, which are shown as an example, the three candidate music-segments 46a, 46b, and 46c are detected. By performing for them the correction processes (a), (b), and (c) as required, similarly to the second correction unit 13, the candidate music-segment 48 is obtained.

Thus, by performing the correction processing in each correction unit, it becomes possible to correct such a segment that is erroneously detected at that instant as a music scene in a non-music scene such as a talk show by performers with sound effects, or such a segment that is detected as part of a non-music scene although being a music scene such as a whole rest as rendering during performance. Moreover, by determining a segment in which music is detected for over a predetermined time such as sixty seconds, which are generally equivalent to one chorus of music, to be a candidate music-segment, it is possible to eliminate a scene inappropriate to be processed as a music scene, such as a short background music scene in talk shows, a catchy part music scene in video clip introduction for advertisement, or an opening or ending theme music scene of a program.

Figure 6:
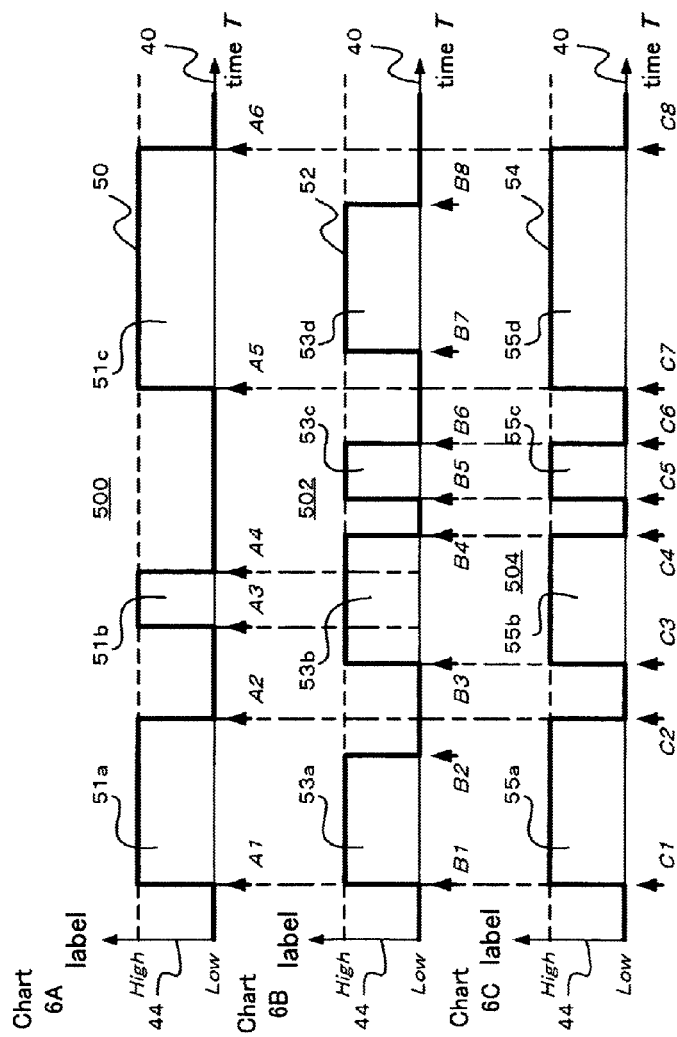
FIG. 6 shows charts illustrating a music-segment detection process according to Embodiment 1.

Next, the processing (ST7) in the music detection unit 14 shown in FIG. 1 will be explained. FIG. 6 shows charts illustrating the process of detection processing of music segments by the music detection unit 14 of Embodiment 1. Chart 6A in the figure is a graph 500 in which labels 50 are plotted that are obtained by the correction-processing by the first correction unit 12, of labels calculated in the first music-candidate detection unit 10. Similarly, Chart 6B in the figure is a graph 502 in which labels 52 are plotted that are obtained by the correction-processing by the second correction unit 13, of differential amounts calculated in the second music-candidate detection unit 11. Chart 6C in the figure is a graph 504 in which labels 54 are plotted that are detection-processed based on the labels 50 and 52. In all the graphs 500, 502, and 504, segments assigned with labels indicating music and segments assigned with labels indicating non-music are expressed with the label axis 44 as "High" and "Low", respectively.

A detection processing of music segments in the music detection unit 14 is further explained with reference to FIG. 6. As an example, candidate music-segments 51a, 51b, and 51c shown by the labels 50 and candidate music-segments 53a, 53b, 53c, and 53d shown by the labels 52 are assumed to have been detected as shown in the figure. The music detection unit 14 of Embodiment 1 processes the candidate music-segments shown with both the labels using the logical OR (logical sum) to detect a music segment, which is specifically explained below with reference to FIG. 6.

In a case of a music segment being detected from the candidate music-segments 51a and 53a both detected with them being time-wise overlapped partially, if their start times A1 and B1 are the same, the start time of the music segment 55a after being detected is determined to be the time C1. The end time of the music segment 55a after being detected, because the end time A2 is longer later than the time B2 (in the direction such that the music segment time-wise extends), is determined to be the time C2 by adopting the time A2.

Similarly, in a case of a music segment being detected from the candidate music-segments 51b and 53b, since the start time B3 is earlier than the start times A3, the start time of the music segment 55b after being detected is determined to be the time C3 by adopting the start time B3. The end time of the music segment 55b after being detected, because the end time B4 is later than the time A4, is determined to be the time C4 by adopting the time B4.

As for the candidate music-segment 53c, since there are no other candidate music-segments overlapped time-wise, the start time B5 and the end time B6 themselves are adopted as the start time C5 and the end time C6 of a music segment 55c after being detected.

Lastly, in a case of a music segment being detected from the candidate music-segments 51c and 53d, since the start time A5 is longer than the start time B7, the start time of the music segment 55d after being detected is determined to be the time C7 by adopting the time A5. The end time of the music segment 55d after being detected, because the start time A6 is longer than the start time B8, is determined to be the time C8 by adopting the time A6. The music segments 55a, 55b, 55c, and 55d after being detected are thereby determined.

Thus, discrimination of candidate music-segments using the logical OR to detect a music segment allows determining to be music segments all the candidate music-segments detected by a plurality of music-candidate detection means with criteria different from each other. Thereby it is possible to detect music of a wide range of genres according to music-candidate detection means employed. Moreover, since the detection using the logical OR merges candidate music-segments, even if a non-music segment that is erroneously detected is included in candidate music-segments detected by the plurality of music-candidate detection means, such a situation does not occur that a music scene having been detected by other music-candidate detection means is eliminated due to an adverse effect in the process of the discrimination processing.

As explained above, the first music-candidate detection unit 10, which can detect with high probability a music scene, i.e., an intermediary portion in a music segment, has a detection characteristic that accuracy of detecting a boundary between a music scene and a non-music scene is slightly poor. The second music-candidate detection means 11, in contrast, has a detection characteristic that the start and end times of a music segment can be detected with high accuracy. In the music detection method according to Embodiment 1, combination of detection means having detection characteristics different from each other as described above makes accuracy of the method higher. In other words, since the detection characteristic of the first music-candidate detection unit 10 and the second music-candidate detection unit 11 have the relationship that their detection characteristics are complementary to each other, the detection of music is improved in accuracy.

Figure 7:
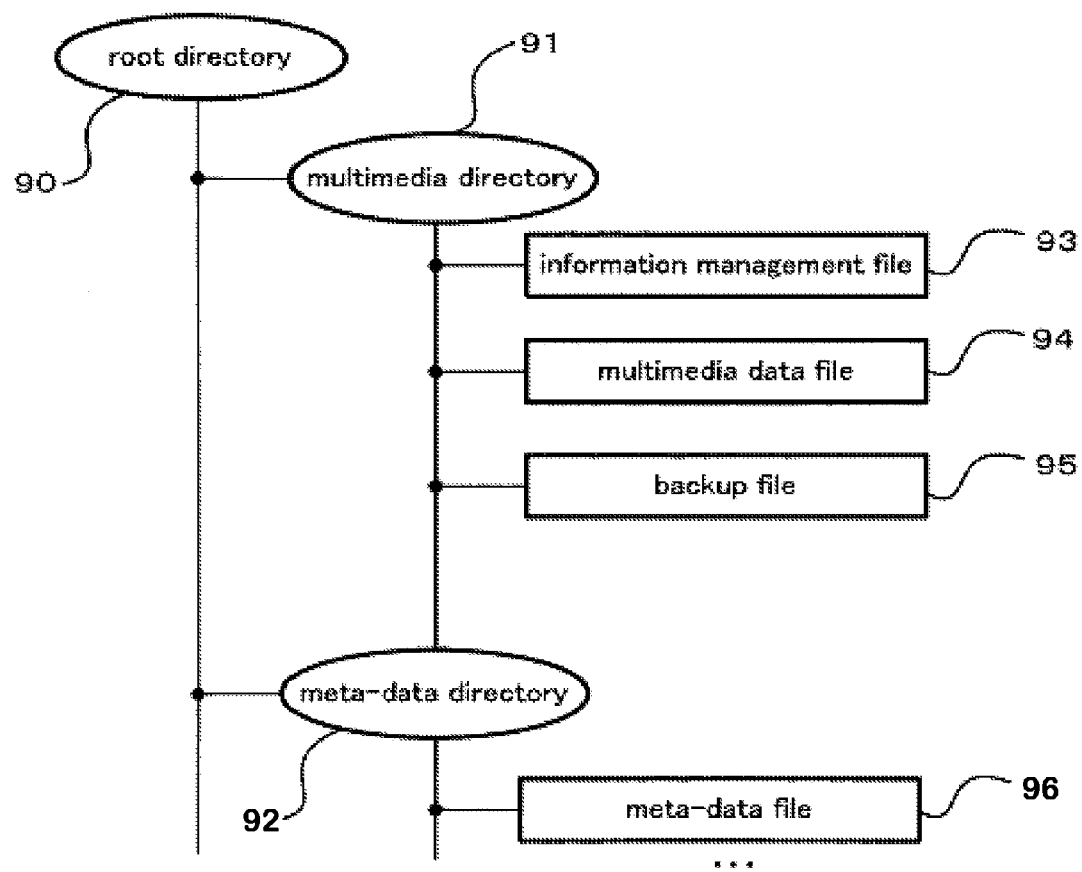
FIG. 7 is a file structure diagram in the audio/video recording device of Embodiment 1.

Next, a method of creating meta-data files from music information of detected music segments in a meta-data generation unit 15 will be explained with reference to FIGS. 7 and 8. FIG. 7 is a file structure diagram in the audio/video recording device of Embodiment 1. In other words, FIG. 7 illustrates a logical file structure of the storage medium 1: a root directory 90 is provided at the top of the directory structure of the logical hierarchy, and a multimedia directory 91 and a meta-data directory 92 are provided under the root directory 90.

In the multimedia directory 91, located are an information management file 93 in which management information including management numbers of programs recorded in the storage medium 1 is written, a multimedia data file 94 in which video signals or audio signals of programs are compression-encoded and multiplexed, and also a backup file 95 for the information management file 93 and the like.

In the meta-data directory 92, on the other hand, a meta-data file 96, which is a separate logical file, is located. Music information of music segments detected when a program is recorded and the multimedia data file 94 is created, is written into the meta-data file.

While FIG. 7 shows an example of the multimedia data file 94 and the meta-data file 96 both being located in the individual directories, the both files may be located in the same directory or the meta-data file 96 may be located immediately below the root directory 90. Moreover, the multimedia data file 94 or the meta-data file 96 may be divided into a plurality of files according to the number of recorded programs or depending on the limitation of file size and the like.

Furthermore, the meta-data file 96 in Embodiment 1, irrespective of their data format, may be in text format or binary format. Furthermore, the meta-data file 96 may be subject to a cryptographic processing in order to prevent falsification of data written in the file and leakage of information.

Furthermore, information such as whether a meta-data file 96 corresponding to a desired program exists or not, or whether valid values exist or not in the meta-data file 96 may be written in the management information file 93. With these information recorded in the information management file 93, existence or validity of music information is quickly determined by referring to the information when playing back the program.

The meta-data file 96 is thus defined to be a separate logical file without information being superimposed on nor multiplexed with the multimedia data file 94. Thereby, in playing back a program, music information can be quickly acquired by reading the relatively small meta-data file 96 without scanning the large multimedia data file 94.

In addition, the information in the meta-data file 96 may be superimposed on the multimedia data file 94. In this case, the number of the files can be reduced, and since the meta-data is included in the multimedia data file, the meta-data can be prevented from scattering, when the multimedia data including music information is recorded on a removable recording medium, on which a file operation such as editing or copying is performed by another device.

Figure 8:
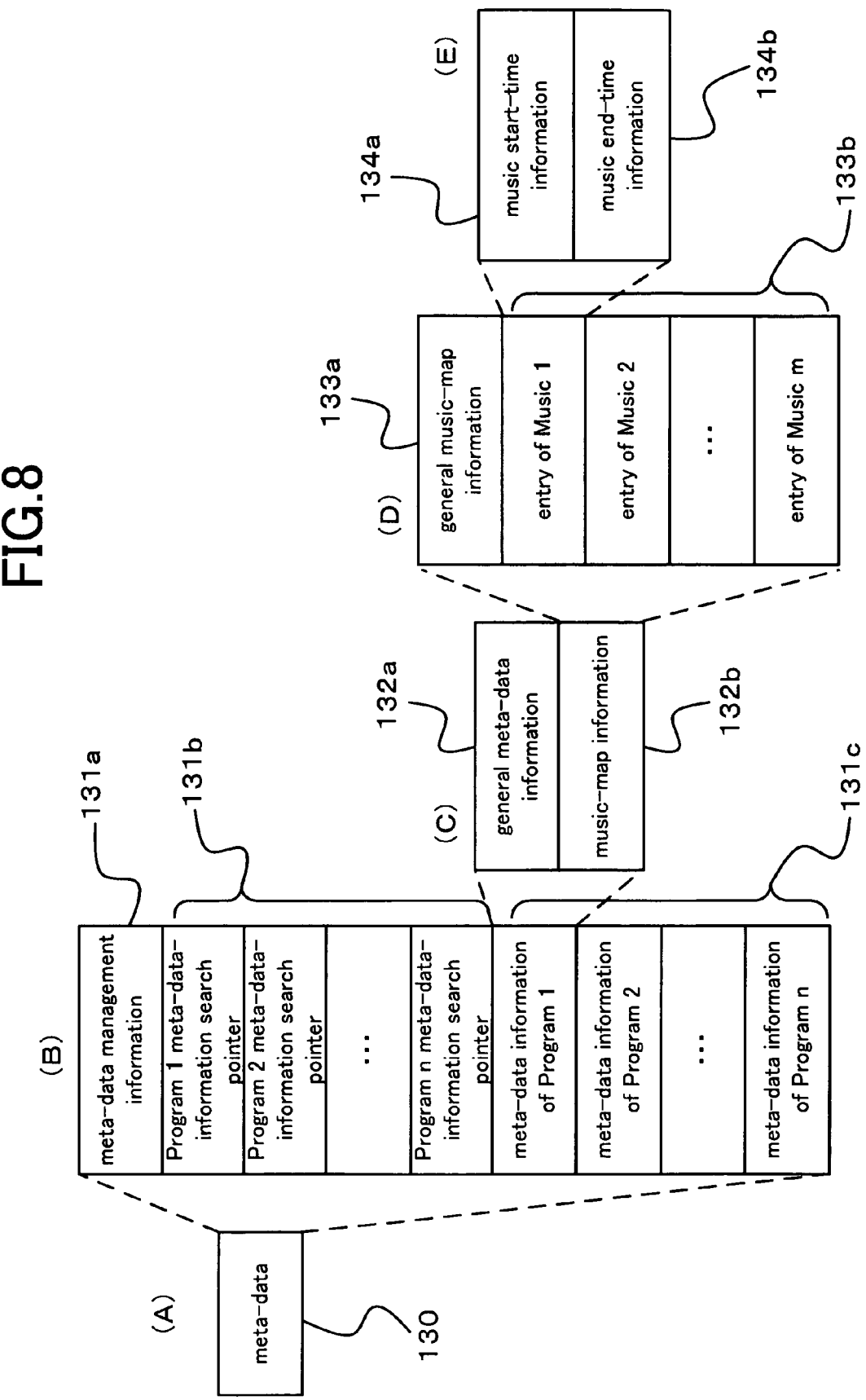
FIG. 8 is a meta data structure diagram according to Embodiment 1.

FIG. 8 is a meta-data structure diagram having a hierarchical structure according to Embodiment 1. In the figure, Diagram 8A indicates meta-data 130 at the top of the hierarchical data structure.

Next, the data structure of the meta-data 130 is explained with reference to Diagram 8B in FIG. 8. Information on the whole meta-data is systematically written in meta-data management information 131a. In this hierarchical level, there are located items of program meta-data information 131c in proportion to the number of programs (one to n) having music information, and program meta-data information search pointers 131b that are items of address information for individually accessing the items of the program meta-data information 131c.

If no programs having music information exist in the storage medium 1, the meta-data file 96 may not be created or may be prepared in which the number of the items of the program meta-data information 131c is written as zero in the meta-data management information 131a.

Next, the data structure of the program meta-data information 131c is explained with reference to Diagram 8C in FIG. 8. In this hierarchical level, there are located general meta-data information 132a and music-map information 132b. In the general meta-data information 132a, there are written the management number of a program to which the program meta-data information 131c corresponds as well as address information for accessing the music-map information 132b and the like. The general meta-data information 132a is tabulated to link a program to meta-data when the management number of a program managed with the information management file 93 does not coincide with the number of the items of the program meta-data information 131c, since music information may not be generated depending on a program, such as when a program other than a music program is recorded.

Next, the data structure of the music-map information 132b is explained with reference to Diagram 8D in FIG. 8. In this hierarchical level, there are located general music-map information 133a and music entries 133b the number of which is equivalent to the number (one to m) of detected music segments. In the general music-map information 133a, address information for individually accessing the music entries 133b are written.

Lastly, the data structure of the music entries 133b is explained with reference to Diagram 8E in FIG. 8. In this hierarchical level, there are located sets of music start-time information 134a and music end-time information 134b of a detected music segment. For the time information, a presentation time (PTM) or the like is used.

As explained above, while an example of a manner to write the start and end times of a music segment in meta-data is described in Embodiment 1, the meta-data is only required to have such a data structure that music information can be specified from a recorded program. For example, when a program is discretized at fixed time intervals such as one second, segments are binarized in such a way that a music scene segment is labeled with "High" (one) and a non-music scene segment is labeled with "Low" (zero); and then a data structure is formed in which the binarized result is enumerated; whereby the equivalent function can also be realized.

Thereby, music information of music in a program can be grasped by reading out the meta-data 130 from the meta-data file 96 in playing back the program recorded in the storage medium 1. Accordingly, the playback control based on music information allows efficiently viewing music scenes with use of such functions as successively playing back music segments only and skipping to the start or end point of a music segment by manual operation.

In other words, in order to skip viewing non-music scenes and CM broadcasts (regarding a processing of CM broadcasts, its explanation will be made in Embodiment 3), it has previously been necessary to search boundaries such as the top or end of a music scene by manual operation of fast-forward or fast-backward playback.

Moreover, when a viewer wants to view music scenes or non-music scenes in a long program recorded in a recording medium, the viewer is forced to find a desired scene while viewing fast-forward (forward scanned) or fast-backward (backward scanned) picture, or to repeat the operation of skipping a fixed time such as fifteen seconds until the desired scene appears. For that reason, it is extremely difficult to play back a music scene without accidentally passing over the start or end point thereof unless the point of the music is accurately grasped in advance. In particular, when playing back a program not having been viewed, because of not knowing where a music scene is in the program, it necessarily takes time and effort to search the music scene from the beginning of the program.

Playback of a program recorded according to Embodiment 1, in contrast, eliminates the operations as described above. That is, it is possible to take such playback control as successively playing back music segments only and skipping to the start or end point of a music segment by manual operation because the music segments can be grasped in advance even when playing back the program not having been viewed.

While Embodiment 1 has been explained by way of example of using a television broadcast for the video signal 3 and the audio signal 4, these signals may also be, for example, an audio/video signal fed from the external input terminal using another video player. Otherwise, music information may be detected from a PCM signal obtained by decoding compression-encoded audio data read from audio/video data recorded in a hard disk (not shown) built into a video recorder, in the removable storage medium 1, or the like. Since this manner eliminates the need to perform the detection processing of music segments in real time during recording, it is possible to take time to perform the detection after recording even when a recording control unit has a low processing capability. Moreover, music information can also be obtained from a program having already been recorded in a storage medium.

Embodiment 2

Figure 9:
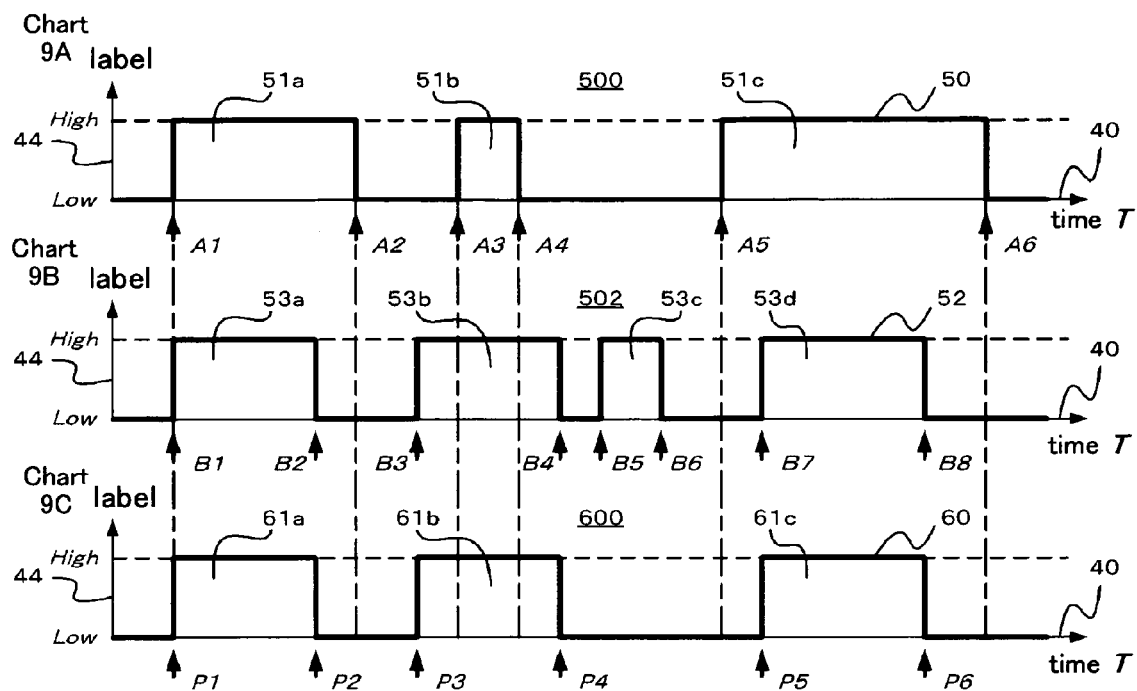
FIG. 9 shows charts illustrating a music-segments detection process according to Embodiment 2.

In Embodiment 2, a detection method different from that explained in Embodiment 1 will be explained as detection processing of music segments by a music detection unit 14. FIG. 9 shows charts illustrating the process of detection processing of music segments by the music detection unit 14 of Embodiment 2. Charts 9A and 9B in the figure are the same as those shown in FIG. 6 in Embodiment 1, and Chart 9C in the figure is a graph 600 in which labels 60 are plotted that are detected by the detection method different from that according to Embodiment 1.

The detection processing of music segments in the music detection unit 14, which is different from the detection processing according to Embodiment 1, is explained with reference to FIG. 9. Embodiment 2 has a feature in that a music segment is detected using either one of labels 50 or labels 52 as a base reference.

As an example, candidate music-segments 51a, 51b, and 51c shown by the labels 50 and candidate music-segments 53a, 53b, 53c, and 53d shown by the labels 52 are assumed to have been detected as shown in the figure. Here, a case is explained where the labels 50 are used as the base reference.

First, searching the start time of a candidate music-segment in the labels 52 around the start time A1 of the candidate music-segment 51*a*, the start time B1 is detected. If the start times A1 and B1 are the same time, the start time of the music segment 61*a* after being detected is determined to be the time P1. Next, searching the end time of the candidate music-segment in the labels 52 around the end time A2 of the candidate music-segment 51*a*, the end time B2 is detected, so that the end time of the music segment 61*a* after being detected is determined to be the time P2 by adopting the end time B2.

Further detecting the start time of the candidate music-segment in the labels 52 around the start time A3 of the candidate music-segment 51*b*, the start time B3 is detected, so that the start time of the music segment 61*b* after being detected is determined to be the time P3 by adopting the start time B3. Similarly, as for the end time A4, the end time B4 is detected, so that the end time of the music segment 61*b* after being detected is determined to be the time P4 by adopting the time B4.

At that time, a range of detecting the start time of a candidate music-segment in the labels 52 is limited from the time A2 to the time A4 with respect to the reference point A3, and a range of detecting the end time of the candidate music-segment in the labels 52 is limited from the time A3 to the time A5 with respect to the reference point A4. In that case, if there are no candidate music-segments in the labels 52, a candidate music-segment in the labels 50 is determined to be a music segment after being detected.

Similarly, as for the music segment 61*c*, its start time P5 and end time P6 are determined by the detection processing. Incidentally, the candidate music-segment 53*c* in the labels 52 is eliminated by the detection processing because there are no corresponding candidate music-segments in the labels 50 used as the base reference.

In this way, in Embodiment 2, used as a base reference is a candidate music-segment detected by the first music-candidate detection unit 10 having the detection characteristic that a music scene i.e., an intermediary portion in a music segment can be detected with high possibility, but the boundary between a music scene and a non-music scene is detected with slightly poor accuracy. Then, the presence or absence of a candidate music-segment, detected by the second music-candidate detection unit 11 having the detection characteristic that the start and end times of a music segment can be detected with high accuracy but a non-music segment may be detected on the other hand, is detected.

In other words, taking into account the both detection characteristics, the detection processing is performed for the start and end times of a music segment by preferentially adopting the start and end times of a candidate music segment detected by the second music-candidate detection unit 11. Thereby, the start and end times of a music segment can be detected with high accuracy with erroneous detection of a non-music scene being able to be reduced.

That is, taking into account the relationship that the both detection characteristics are complementary to each other, a music segment can be detected with high accuracy by detecting the start and end times of the music segment based on a music scene that is an intermediary portion in the music segment.

Embodiment 3

Figure 10:
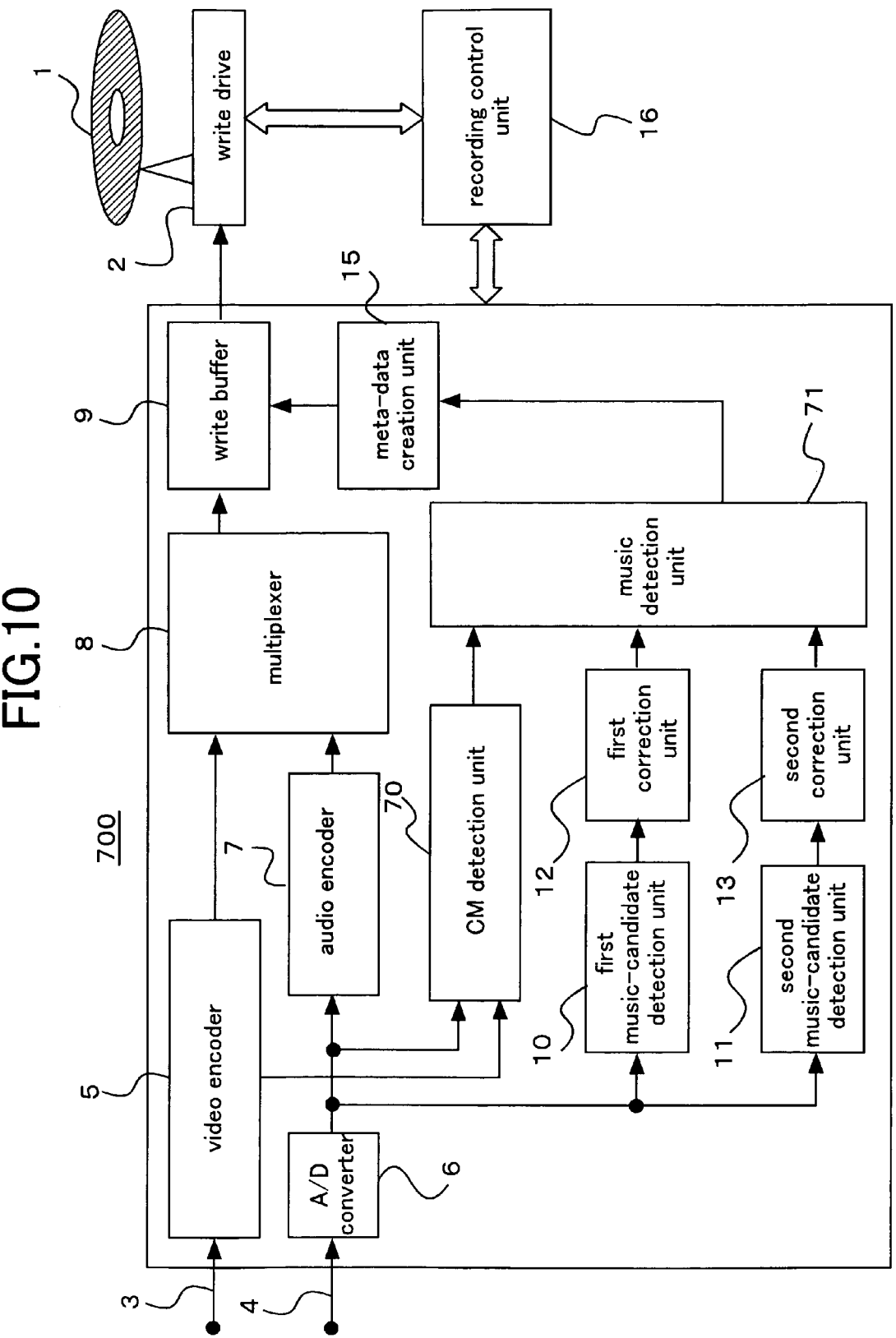
FIG. 10 is a system block diagram illustrating an audio/video recording device of Embodiment 3.
Figure 11:
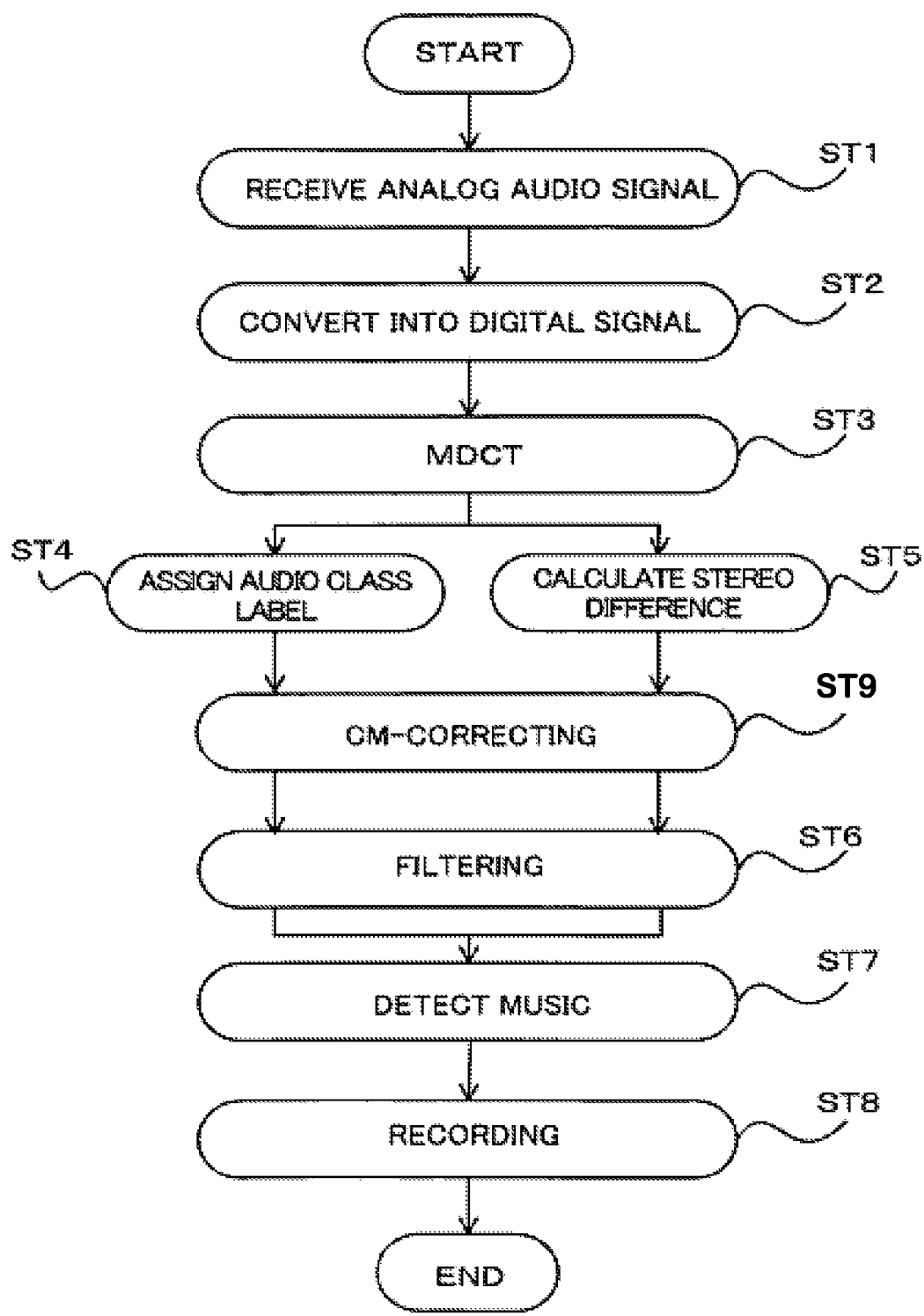
FIG. 11 is a flow chart illustrating a method of detecting and recording music segments, according to Embodiment 3.

Embodiment 3 has a feature in that CM broadcast segments are detected. FIG. 10 is a system block diagram illustrating an audio/video recording device of Embodiment 3. FIG. 11 is a flow chart illustrating a method of detecting and recording music segments according to Embodiment 3. An audio/video recording device 700 is provided with a CM detection unit 70 for detecting a CM broadcast segment based on characteristics of the video signal 3 and the audio signal 4 of a television broadcast or the like to be recorded (ST9). The start and end times of a CM broadcast segment detected by the CM detection unit 70 are outputted to a music detection unit 71. Other constituent elements are the same as those shown in Embodiment 1; their explanations are therefore omitted here.

Next, an operation of the CM detection unit 70 will be explained with reference to FIGS. 10 and 11. Firstly, a video encoder 5 monitors variations of a brightness signal, color difference components (YUV format) and the like of video frames such as intra-pictures in video data compression-encoded from the video signal 3 using an MPEG-2 scheme. The CM detection unit 70 is provided with a function of determining that a scene change occurs when the variations become larger than predetermined threshold values. The CM detection unit 70 is further provided with a function of determining that there are no sounds when the amplitude of an audio waveform in audio data converted into a PCM format from the audio signal 4 by an A/D converter 6 becomes smaller than a predetermined threshold value.

In television broadcasts, a program-body segment except for CM broadcast segments is referred to as "main broadcast segment". Generally, silence and a scene change simultaneously exist in a boundary between a CM broadcast segment and a main broadcast segment, or in boundaries between a plurality of successive CM broadcast segments, and one CM broadcast lasts for a fixed time such as fifteen or thirty seconds. Focusing on these features, when sections in which silence and scene changes are synchronously detected succeed at predetermined intervals, the CM detection unit 70 determines the sections to be CM broadcast segments. The CM detection unit 70 calculates presentation times (PTMs) indicating time information on the start and end times of the segments in which a plurality of CM broadcasts is successive, to output the presentation times to the music detection unit 71.

Incidentally, regarding a means for detecting a CM broadcast, its method does not matter if it uses a technique that is able to detect the start and end times of a CM broadcast segment. For example, a section may be detected in which the audio signal 4 changes in its audio mode from a monaural signal, which is used in most of main broadcasts, to a stereo signal, which is used in most of CM broadcasts. A black picture (black frame) may also be detected, which appears at a boundary between a main broadcast segment and a CM broadcast segment in the video signal 3. A CM broadcast segment may as well be detected from an audio signal only or a video signal only.

Figure 12:
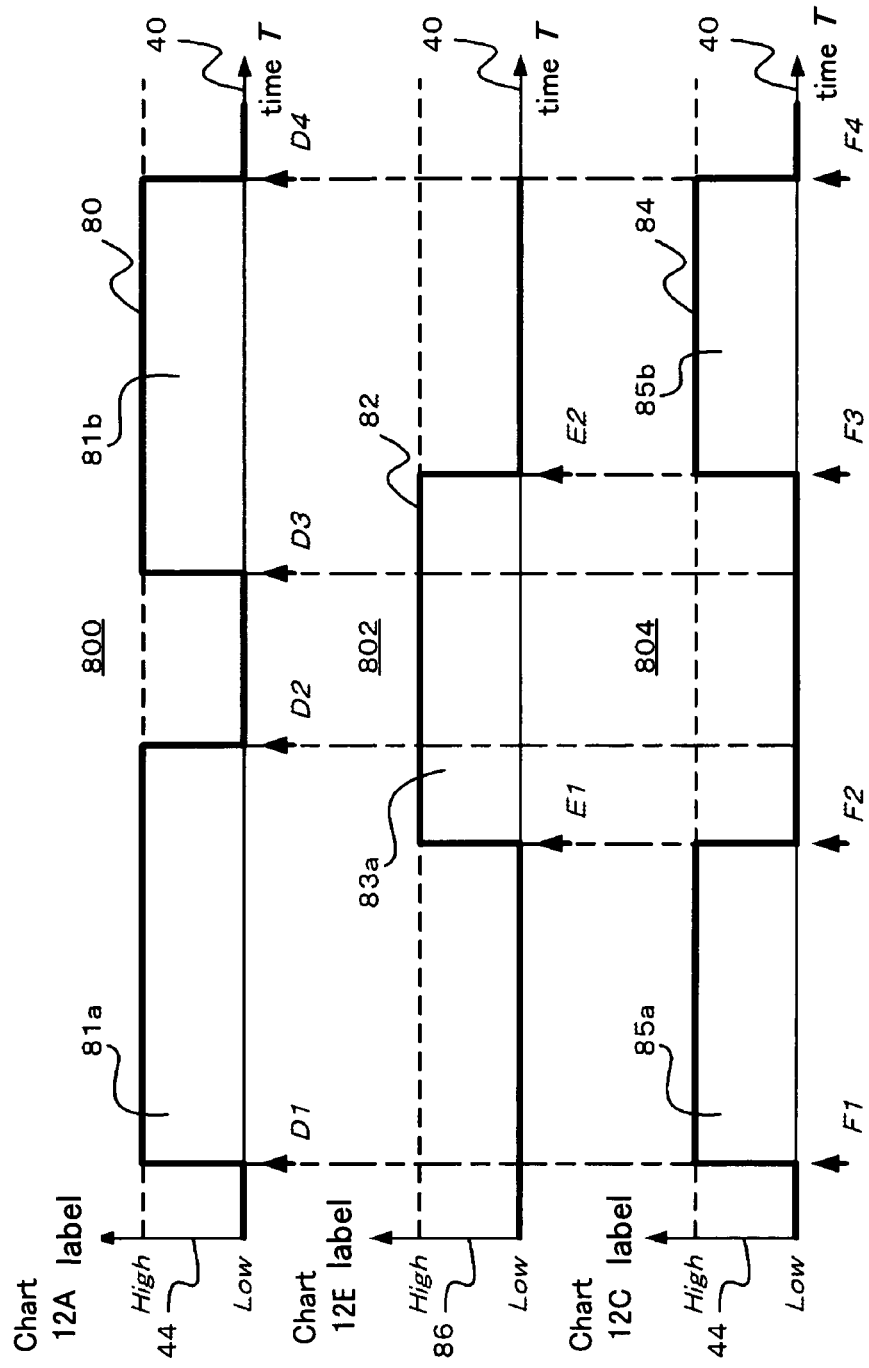
FIG. 12 shows charts illustrating a CM-broadcast-segment detection process according to Embodiment 3.

FIG. 12 shows charts illustrating the process of detection processing by the music detection unit 71 of Embodiment 3 (corresponding to "DETECT CM" of ST9 in FIG. 11). Chart 12A in the figure is a graph 800 in which labels 80 that are detected segments are plotted. As for a method of detection processing of music segments, the methods explained in Embodiment 1 and Embodiment 2 are employed. Chart 12B in the figure is a graph 802 in which CM labels 82 are plotted indicating a CM broadcast segment detected by the CM detection unit. In the chart, a segment detected as a CM broadcast and segments other than that are expressed with the label axis 86 by "High" and "Low", respectively.

Chart 12C is a graph 804 in which corrected CM-labels 84 are plotted that are obtained by further re-detecting the labels 80 and the CM labels 82 both having been detection-processed. In both graphs 800 and 804, segments labeled with "High" indicating a music segment, and those labeled with "Low" indicating a non-music segment are expressed with the label axis 44.

Next, a detection processing of a CM broadcast in the music detection unit 71 will be explained with reference to FIG. 12. As an example, when there are music segments 81*a* and 81*b* in the labels 80, which are obtained from candidate music-segments by a first and second music candidate detection means, and a CM broadcast segment 83*a* detected from a CM broadcast by the CM detection unit 70, portions of segments overlapped with the CM broadcast segment 83*a*, of the music segments 81*a* and 81*b* are correction-processed to non-music segments.

The above is specifically explained below with reference to FIG. 12. The start time D1 of the music segment 81*a* is not overlapped with the CM broadcast, but the end time D2 is overlapped with the CM broadcast segment 83*a*. Hence, the start time of the music segment 85*a* after being CM-correction-processed is determined to be the time F1 by adopting the time D1, and the end time is determined to be the time F2 by adopting the start time E1 of the CM broadcast segment 83*a*.

Similarly, the end time D4 of the music segment 81*b* is not overlapped with the CM broadcast; but the start time D3 is overlapped with the CM broadcast segment 83*a*. Hence, the start time of the music segment 85*b* after being CM-correction-processed is determined to be the time F3 by adopting the end time E2 of the CM broadcast segment 83*a*, and the end time is determined to be the time F4 by adopting the time D4. If a music segment after being detection-processed is entirely overlapped with a CM broadcast segment, which is not shown in the figure, the music segment is eliminated by the CM-correction processing.

In this way, a segment in which a CM broadcast is detected is eliminated from a music segment, which brings about an effect that a CM broadcast, in which music is frequently used as background music (BGM) or sound effects, is not erroneously detected without being confused with a music scene wanted to be viewed as an intrinsic music program.

While the method of eliminating a CM broadcast segment after a music segment has been detected is explained in Embodiment 3, after candidate music-segments have been determined, a CM broadcast segment is eliminated from each candidate music-segment, and then a music segment may be detected. A CM broadcast segment may also be eliminated before candidate music segments are detected.

Moreover, while in Embodiment 1 through Embodiment 3 the candidate-music-segment detection means and the correction means are separately provided, a music detection means having functions of these two means may be provided.

Furthermore, while in Embodiment 1 through Embodiment 3 multimedia data including a music segment is recorded, multimedia data of a detected music segment only may be recorded.

What is claimed is:

1. A music-segment detection method comprising:
   a data input step of inputting audio/video data including an audio signal and a video signal;
   a plurality of candidate-music-segment detection steps of detecting, by utilizing a plurality of candidate-music-segment detection units, from the audio signal, respective candidate music-segments of the audio/video data, based on a plurality of criteria different from each other; and
   a music-segment detection step of detecting a music segment based on the plurality of candidate music-segments each detected by the plurality of candidate-music-segment detection steps, wherein
   the plurality of criteria includes a first criterion and a second criterion,
   the first criterion has the detection characteristic configured to detect a music scene wherein the first criteria is set based on whether or not the characteristic of the audio signal corresponds to a class model determined to be a music scene among a plurality of predetermined audio class models,
   the second criterion has the detection characteristic configured to detect a music segment wherein the second criterion is set based on the difference between the left and right channels of the audio signal,
   wherein the music-segment detection step comprises:
   searching for the start time of the candidate music-segment detected according to the second criterion around the start time of the candidate music-segment detected according to the first criterion;
   adopting the start time found in the searching as the start time of the music segment;
   searching for the end time of the candidate music-segment detected according to the second criterion around the end time of the candidate music-segment detected according to the first criterion; and
   adopting the end time found in the searching as the end time of the music segment and wherein
   the plurality of candidate-music-segment detection steps includes a plurality of respective correction steps each correcting the detected respective candidate music-segments: and
   the music-segment detection step detects a music segment based on the respective candidate music-segments, instead of the plurality of candidate music-segments, each corrected by the plurality of correction steps.

2. The music-segment detection method of claim 1, wherein the difference between the left and right channels of the audio signal or the characteristic of the audio signal is calculated based on orthogonal transform coefficients obtained by orthogonally transforming the audio signal.

3. The music-segment detection method of claim 1, further comprising a commercial detection step of detecting a commercial segment based on the audio and video signals, wherein in the music-segment detection step the commercial segment is further eliminated from the music segment detected based on the plurality of candidate music-segments.

4. A data recording method comprising: a data recording step of recording data including that of a music segment detected by the music-segment detection method as in any of claims 1, 2 or 3; and a time-information recording step of recording time information of the music segment.

5. A music-segment detection device comprising:
   a plurality of candidate-music-segment detection units for detecting, from an audio signal in audio/video data including the audio signal and a video signal, respective candidate music-segments of the audio/video data, based on a plurality of criteria different from each other; and
   a music-segment detection unit for detecting a music segment based on the plurality of candidate music-segments each detected by the plurality of candidate-music-segment detection units, wherein
   the plurality of criteria includes a first criterion and a second criterion,
   the first criterion has the detection characteristic configured to detect a music scene wherein the first criteria is set based on whether or not the characteristic of the audio signal corresponds to a class model determined to be a music scene among a plurality of predetermined audio class models, the second criterion has the detection characteristic configured to detect a music segment wherein the second criterion is set based on the difference between left and right channels of the audio signal, wherein the music-segment detection unit is configured for:

searching for the start time of the candidate music-segment detected according to the second criterion around the start time of the candidate music-segment detected according to the first criterion;

adopting the start time found in the searching as the start time of the music segment;

searching for the end time of the candidate music-segment detected according to the second criterion around the end time of the candidate music-segment detected according to the first criterion; and adopting the end time found in the searching as the end time of the music segment, and wherein the plurality of candidate-music-segment detection units includes a plurality of respective correction units each correcting the detected respective candidate music-segments; and the music-segment detection unit detects a music segment based on the respective candidate music-segments, instead of the plurality of candidate music-segments, each corrected by the plurality of correction units.

6. The music-segment detection device of claim 5, wherein the difference between the left and right channels of the audio signal or the characteristic of the audio signal is calculated based on orthogonal transform coefficients obtained by orthogonally transforming the audio signal.

7. The music-segment detection device of claim 5, further comprising a commercial detection unit for detecting a commercial segment based on the audio and video signals, wherein the music-segment detection unit further eliminates the commercial segment from the music segment detected based on the plurality of candidate music-segments.

8. A data recording device comprising a data recording unit for recording data including that of a music segment detected by the music-segment detection device as in any of claims 5, 6 or 7, wherein the data recording unit records time information of the music segment.

9. The music-segment detection method of claim 1, wherein the music-segment detection step further comprises:
 determining the candidate music-segment detected according to the first criterion as the music segment if there are no candidate music-segments detected according to the second criterion; and
 eliminating the candidate music-segment detected according to the second criterion if there are no corresponding candidate music-segments detected according to the first criterion.

10. The music-segment detection device of claim 5, wherein the music-segment detection unit is further configured for:
 determining the candidate music-segment detected according to the first criterion as the music segment if there are no candidate music-segments detected according to the second criterion; and
 eliminating the candidate music-segment detected according to the second criterion if there are no corresponding candidate music-segments detected according to the first criterion.

* * * * *